(12) United States Patent
Lee et al.

(10) Patent No.: US 12,139,292 B2
(45) Date of Patent: Nov. 12, 2024

(54) CLAMPING DEVICE AND CLAMPING METHOD

(71) Applicant: ARISE BIOTECH CORPORATION, New Taipei (TW)

(72) Inventors: Te-Hua Lee, New Taipei (TW); Chung-Che Lo, New Taipei (TW); Chih-Wei Lai, New Taipei (TW)

(73) Assignee: ARISE BIOTECH CORPORATION, New Taipei (TW)

( * ) Notice: Subject to any disclaimer, the term of this patent is extended or adjusted under 35 U.S.C. 154(b) by 0 days.

(21) Appl. No.: 18/243,323

(22) Filed: Sep. 7, 2023

(65) Prior Publication Data

US 2024/0278947 A1    Aug. 22, 2024

(30) Foreign Application Priority Data

Feb. 18, 2023   (TW) .................................. 112105958

(51) Int. Cl.
   *B65B 7/28*   (2006.01)
(52) U.S. Cl.
   CPC .................................. *B65B 7/2842* (2013.01)
(58) Field of Classification Search
   None
   See application file for complete search history.

(56) References Cited

U.S. PATENT DOCUMENTS

| | | | | |
|---|---|---|---|---|
| 1,319,845 A | * | 10/1919 | Buzatt | B67B 3/2066 53/355 |
| 4,696,144 A | * | 9/1987 | Bankuty | B67B 3/206 53/317 |
| 5,417,031 A | * | 5/1995 | Bankuty | B67B 3/2033 53/331.5 |

FOREIGN PATENT DOCUMENTS

| | | | |
|---|---|---|---|
| CN | 1196449 C | | 4/2005 |
| CN | 108217555 A | | 6/2018 |
| CN | 115503992 A | * | 12/2022 |
| CN | 115594131 A | | 1/2023 |
| EP | 0266061 A3 | | 7/1988 |
| KR | 102443780 B1 | * | 9/2022 |
| TW | M530815 U | | 10/2016 |

OTHER PUBLICATIONS

Taiwan Patent Office "Notice of Allowance" issued on Nov. 3, 2023, Taiwan.
Taiwan Patent Office "Office Action" issued on Sep. 26, 2023, Taiwan.

* cited by examiner

*Primary Examiner* — Tanzim Imam
(74) *Attorney, Agent, or Firm* — WPAT, P.C (57) ABSTRACT

A clamping device is applied to a cover of a container and comprises a first gear plate having a first rail hole, a second gear plate having a second rail hole, a guiding plate configured between the first gear plate and the second gear plate and having a guiding slot, a first motor, a second motor and a clamp assembly. The first motor is configured to drive the first gear plate to rotate. The second motor is configured to drive the second gear plate to rotate. The clamp component of the clamp assembly is disposed in the first rail hole, the second rail hole and the guiding slot and configured to contact the cover. The first motor and the second motor drive the first gear plate and the second gear plate to rotate in opposite directions and drive the clamp component to move inwardly for clamping the cover.

10 Claims, 7 Drawing Sheets

CLAMPING DEVICE AND CLAMPING METHOD

BACKGROUND OF THE INVENTION

1. Field of the Invention

The present invention relates to a clamping device and a clamping method, and more particularly, to a clamping device and clamping method for automatically sealing or detaching a cover from a container.

2. Description of the Prior Art

In the biological and medical fields, biological samples are often collected for various tests and stored in containers (e.g. test tubes, culture flasks, etc.). Containers with covers are often used for preventing contamination of the biological samples. Furthermore, since some of the biological samples would need to be centrifuged, it is common for the tester to use containers with screw caps to prevent leakage or spillage of the biological samples when the covers is separated from the containers.

However, when the biological samples have to be removed or added, the tester has to manually unscrew the covers of the containers. Moreover, after the biological samples have been removed or added, the tester must manually tighten the covers of the containers again. This not only reduces efficiency and operational stability, but also increases labor costs when testing large quantities of biological samples.

SUMMARY OF THE INVENTION

In view of this, one scope of the present invention is to provide a clamping device to solve the problems of the prior art.

According to an embodiment of the present invention, the clamping device is applied to a cover of a container to seal or detach the cover from the container. The clamping device comprises a first gear plate, a second gear plate, a guiding plate, a first motor, a second motor and a clamp assembly. The first gear plate has a first axis and at least two first rail slots. The first rail slots are arc-shaped and located to one side of the first axis. The second gear plate has a second axis and at least two second rail slots. The second axis is collinear with the first axis. The second rail slots are arc-shaped and located to one side of the second axis, and the second rail slots are interlaced with the first rail slots, respectively. The guiding plate is disposed between the first gear plate and the second gear plate and has a third axis and at least two guiding slots. The third axis is collinear with the first axis. The guiding slots are straight and radially disposed around the third axis, the guiding slots are interlaced with the first rail slots and the second rail slots, respectively. The first motor is coupled to the first gear plate to drive the first gear plate to rotate on the first axis. The second motor is coupled to the second gear plate to drive the second gear plate to rotate on the second axis. The clamp assembly comprises at least two clamp components and each of the clamp components has a connection portion and a contact portion. The connection portion of the clamp components is disposed in the first rail slot, the second rail slot and the guiding slot, and the contact portion is configured to contact the cover of the container. Wherein, when the first motor and the second motor drive the first gear plate and the second gear plate to rotate in one of opposite directions or the same direction with unequal speeds, the first gear plate and the second gear plate drive the clamp components to move along the guiding slots toward the first axis respectively through the first rail slots and the second rail slots, so as to enable the clamp assembly to grip the cover of the container.

Wherein, when the clamp assembly grips the cover of the container and the first motor and the second motor respectively drive the first gear plate and the second gear plate to rotate in the same direction and at the same speed, the first gear plate and the second gear plate drive the clamp component to rotate on the first axis for sealing or detaching the cover from the container.

Wherein, the clamp component is a round bar. In an embodiment, the connection portion of the clamp component is a round bar and the shape of the contact portion is corresponding to the shape of the cover of the container.

Wherein, the clamping device of the present invention further comprises at least two slide blocks respectively disposed in the guiding slots to move in the guiding slots. The slide blocks respectively comprise a mounting hole, and the connection portion of the clamp component is disposed in the first rail slot, the second rail slot and the mounting hole at the same time.

Wherein, the clamp assembly comprises at least two clamp components. The first gear plate has at least two first rail slots, the second gear plate has at least two second rail slots, and the guiding plate has at least two guiding slots. The clamp components are respectively disposed in the first rail slots, the second rail slots, and the guiding slots. When the first motor and the second motor respectively drive the first gear plate and the second gear plate to rotate in one of the opposite directions or the same direction with unequal speeds, the clamp components simultaneously move toward the first axis to grip the cover of the container.

Another scope of the present invention is to provide a clamping method which comprises the following steps of: setting a container in a clamping device and a cover of the container corresponding to a clamp assembly of the clamping device, wherein the clamping device comprises a first gear plate, a second gear plate, and a guiding plate, at least two clamp components of the clamp assembly are simultaneously and respectively disposed in at least two first rail slots of the first gear plate, at least two second rail slots of the second gear plate, and at least two guiding slots of the guiding plate, and the first rail slots, the second rail slots, and the guiding slots are interlaced with each other; a first motor and a second motor of the clamping device respectively driving the first gear plate and the second gear plate to rotate in one of opposite directions or the same direction with unequal speeds, and the first gear plate and the second gear plate driving the clamp components to move inwardly along the guiding slots respectively through the first rail slots and the second rail slots, so as to enable the clamp assembly to grip the cover of the container; and the first motor and the second motor respectively driving the first gear plate and the second gear plate to rotate in the same direction with the same speed, so as to enable the cover to seal or detach from the container.

Wherein, the clamping method further comprises the following steps of: the first motor and the second motor respectively driving the first gear plate and the second gear plate to rotate in one of the opposite directions or the same direction with unequal speeds, and the first gear plate and the second gear plate driving the clamp component to move outwardly along the guiding slot respectively through the first rail slot and the second rail slot, so as to enable the clamp component to detach from the cover of the container.

In summary, the two motors of the clamping device in the present invention can respectively drive the gear plate to rotate in the opposite directions or in the same direction, and the rail slots of the gear plates can control the opening and closing of the clamp assembly. According to the above-mentioned, the covers can be opened and closed automatically instead of screwing the covers manually, so as to enhance the efficiency and reduce the labor costs and the equipment costs. In addition, the clamp components of the clamping device in the present invention can move smoothly and steadily in a straight line through the slide blocks, so as to improve the stability of the clamping.

DETAILED DESCRIPTION OF THE INVENTION

For the sake of the advantages, spirits and features of the present invention can be understood more easily and clearly, the detailed descriptions and discussions will be made later by way of the embodiments and with reference of the diagrams. It is worth noting that these embodiments are merely representative embodiments of the present invention, wherein the specific methods, devices, conditions, materials and the like are not limited to the embodiments of the present invention or corresponding embodiments. Moreover, the devices in the figures are only configured to express their corresponding positions and are not drawing according to their actual proportion.

In the description of this specification, the description with reference to the terms "an embodiment", "another embodiment" or "part of an embodiment" means that a particular feature, structure, material or characteristic described in connection with the embodiment including in at least one embodiment of the present invention. In this specification, the schematic representations of the above terms do not necessarily refer to the same embodiment. Furthermore, the particular features, structures, materials or characteristics described can be combined in any suitable manner in one or more embodiments. Furthermore, the indefinite articles "a" and "an" preceding a device or element of the present invention are not limiting on the quantitative requirement (the number of occurrences) of the device or element. Thus, "a" should be read to include one or at least one, and a device or element in the singular also includes the plural unless the number clearly refers to the singular.

Furthermore, in the description of the present invention, it is to be understood that the terms "vertical, horizontal, up, down, front, back, left, right, top, bottom, inside, outside," etc., indicate orientation or positional relationships that are based on the orientation or positional relationships shown in the accompanying drawings. They are merely intended to facilitate and simplify the description of the present invention, and are not intended to indicate that the said device or element must have a particular orientation, be constructed and operate in a particular orientation. Accordingly, it is not to be construed as a limitation of the present invention.

Figure 1:
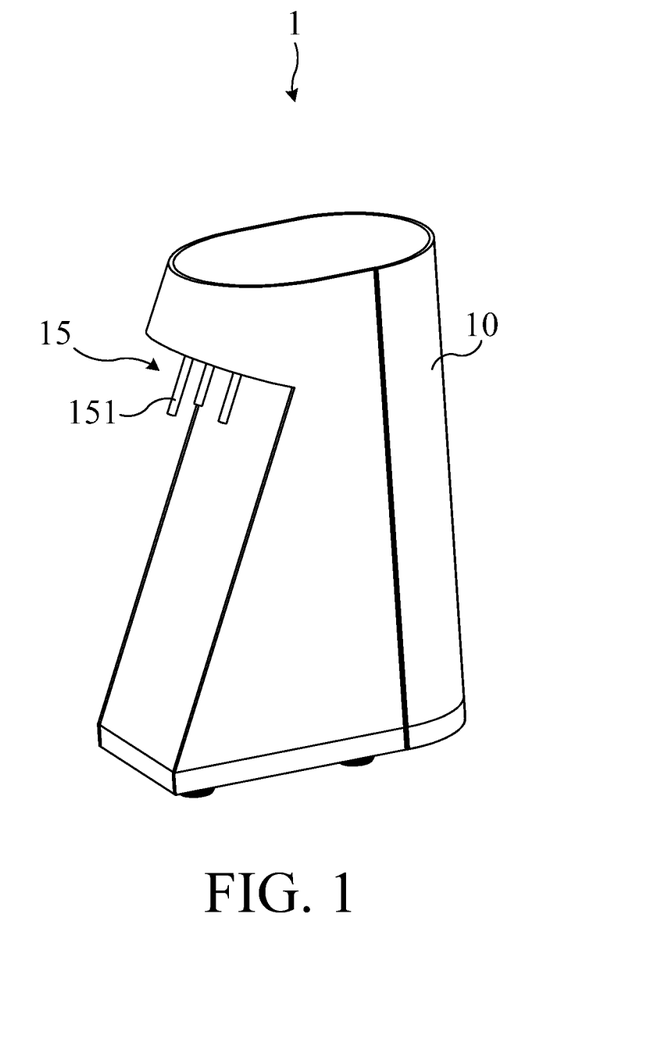
FIG. 1 is a structural schematic diagram illustrating a clamping device according to an embodiment of the present invention.
Figure 2:
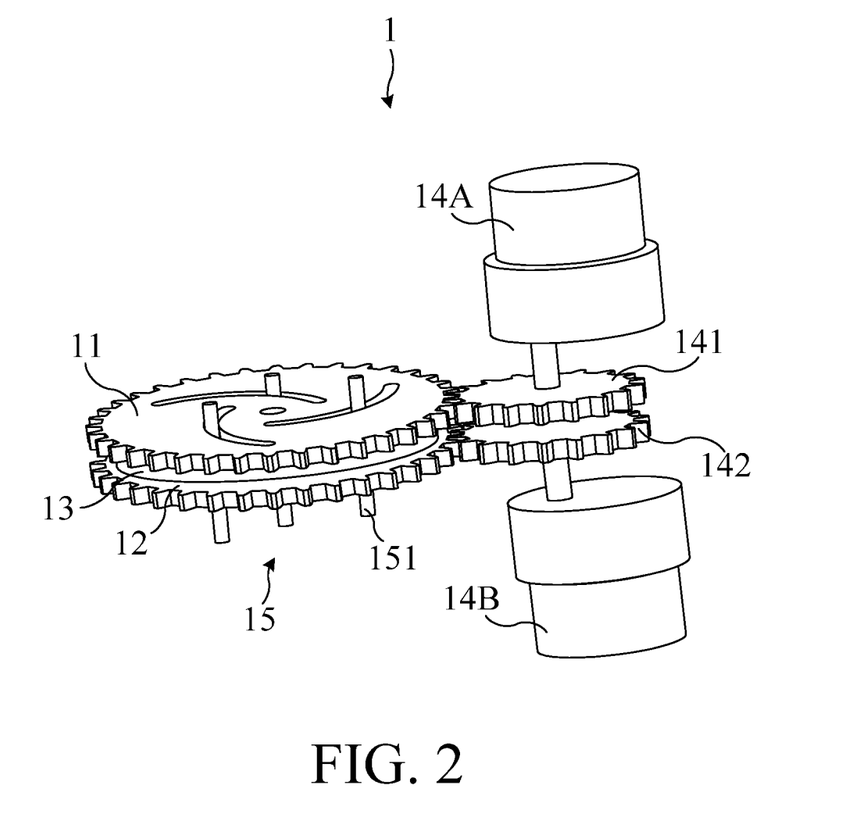
FIG. 2 is a structural assembly diagram illustrating a clamping device in FIG. 1 without a shell.
Figure 3:
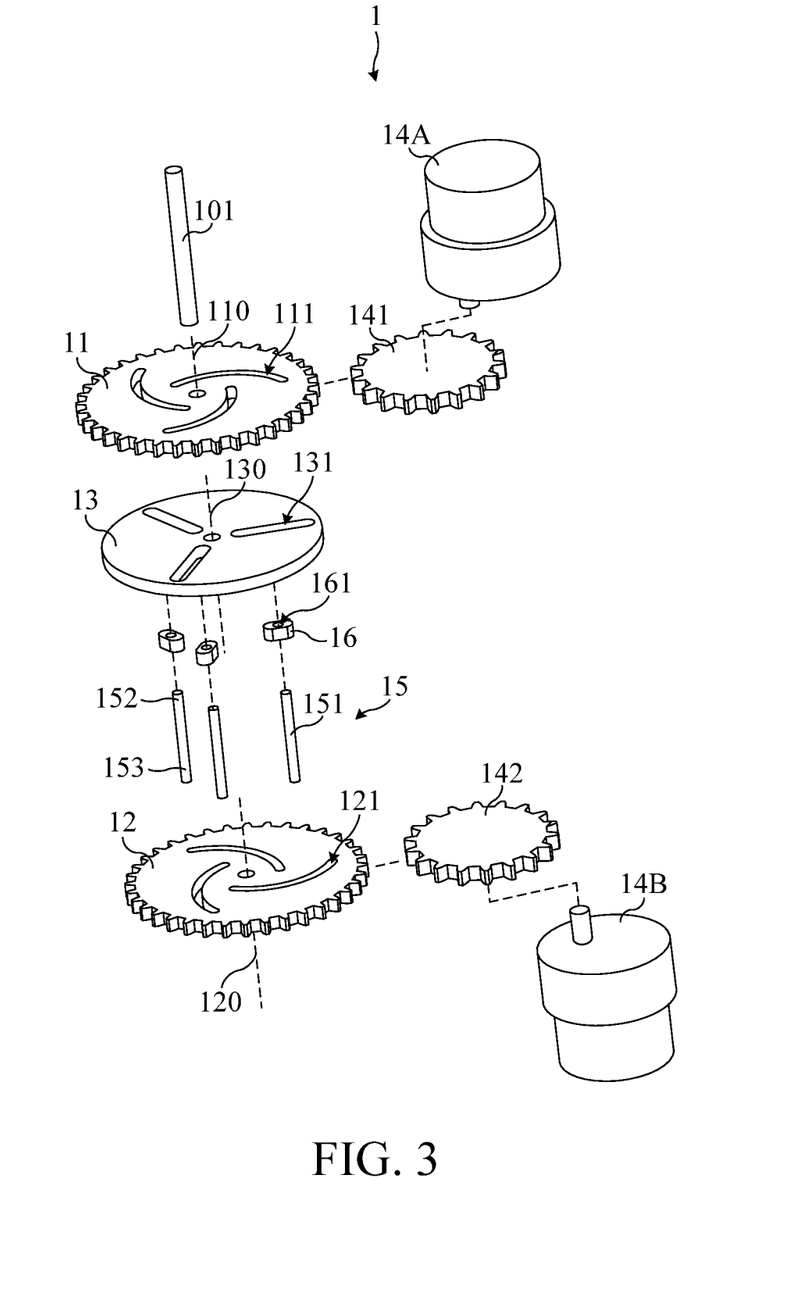
FIG. 3 is an exploded view illustrating a clamping device in FIG. 2.

Please refer to FIG. 1, FIG. 2 and FIG. 3. FIG. 1 is a structural schematic diagram illustrating a clamping device 1 according to an embodiment of the present invention. FIG. 2 is a structural assembly diagram illustrating a clamping device 1 in FIG. 1 without a shell 10. FIG. 3 is an exploded view illustrating a clamping device 1 in FIG. 2. As shown in FIG. 1, FIG. 2 and FIG. 3, the clamping device 1 of the present embodiment comprises a shell 10, a first gear plate 11, a second gear plate 12, a guiding plate 13, a first motor 14A, a second motor 14B and a clamp assembly 15. The second gear plate 12 is located to one side of the first gear plate 11, and the guiding plate 13 is disposed between the first gear plate 11 and the second gear plate 12. The first motor 14A is coupled to the first gear plate 11, and the second motor 14B is coupled to the second gear plate 12. One end of the clamp assembly 15 extends through the first gear plate 11, the second gear plate 12, and the guiding plate 13. The other end of the clamp assembly 15 protrudes from the exterior of the shell 10. The clamping device of the present invention is applied to a cover of a container to seal or detach the cover from the container. In practice, the container can be a screw-cap test tube, a screw-cap centrifuge tube, a tissue culture flask, a serum bottle, or other screw-cap container.

In the present embodiment, the first gear plate 11 has a first axis 110 and first rail slots 111. The first rail slots 111 are disposed on the plate surface of the first gear plate 11 and are located to one side of the first axis 110. Furthermore, the first rail slots 111 are arc-shaped and are through holes. In the present embodiment, the first gear plate 11 has three first rail slots 111 and the first rail slots 111 are equally and circumferentially disposed on the plate surface.

In the present embodiment, the second gear plate 12 has a second axis 120 and second rail slots 121. The second rail slots 121 are arc-shaped and are through holes. In the present embodiment, the second gear plate 12 has three second rail slots 121 and the second rail slots 121 are equally and circumferentially disposed on the plate surface. Furthermore, the second axis 120 of the second gear plate 12 is collinear with the first axis 110 of the first gear plate 11, and the second rail slots 121 of the second gear plate 12 are interlaced with the first rail slots 111 of the first gear plate 11, respectively. In practice, when the first gear plate 11 and the second gear plate 12 are overlapped with each other, each of the first rail slots 111 corresponds to a second rail slot 121, and through holes are formed at the intersection of the first rail slots 111 and the second rail slots 121.

In the present embodiment, the guiding plate 13 has a third axis 130 and guiding slots 131. The guiding slots 131 are disposed on the plate surface of the guiding plate 13 and are located to one side of the third axis 130. The guiding slots 131 are straight and are and are through holes. In the present embodiment, the guiding plate 13 has three guiding slots 131 and the guiding slots 131 are equally disposed on the plate surface in a radial pattern. Furthermore, the third axis 130 of the guiding slots 131 is collinear with the first axis 110 of the first gear plate 11, the guiding slots 131 of the guiding plate 13 are interlaced with the second rail slots 121 of the second gear plate 12 and the first rail slots 111 of the first gear plate 11, respectively. In practice, the clamping device 1 can comprise a fixed axis 101, and the first gear plate 11, the second gear plate 12 and the guiding plate 13 can be disposed on the fixed axis 101. The first axis 110, the second axis 120 and the third axis 130 are collinear with each other, and are the axes of the fixed axis 101. The dimensions of the first gear plate 11, the second gear plate 12, and the guiding plate 13 can be the same, but it is not limited to the aforementioned, the dimensions of the guiding plate 13 can be slightly smaller than the dimensions of the first gear plate 11 and the second gear plate 12. When the first gear plate 11, the second gear plate 12, and the guiding plate 13 are overlapped with each other, each of the first rail slots 111 corresponds to a second rail slot 121 and a guiding slot 131, and a through hole is formed at the intersection of the first rail slot 111, the second rail slot 121 and the guiding slot 131. That is, the clamping device 1 in the present embodiment comprises three sets of rails.

In the present embodiment, the first motor 14A is configured to drive the first gear plate 11 to rotate on the first axis 110, and the second motor 14B is configured to drive the second gear plate 12 to rotate on the second axis 120. That is, both the first gear plate 11 and the second gear plate 12 rotate on the fixed axis 101. Furthermore, the clamping device 1 comprises a first driving plate 141 and a second driving plate 142. The first motor 14A has a rotating shaft connected to the center of the first driving plate 141, and the first driving plate 141 is embedded in the first gear plate 11. The second motor 14B has a rotating shaft connected to the center of the second driving plate 142, and the second driving plate 142 is embedded in the second gear plate 12. Therefore, the first motor 14A can drive the first driving plate 141 to rotate and further rotate the first gear plate 11, and the second motor 14B can drive the second driving plate 142 to rotate and further rotate the second gear plate 12. Furthermore, the first motor 14A and the second motor 14B can control the direction of rotation of the first gear plate 11 and the second gear plate 12, respectively. The first motor 14A and the second motor 14B can control the first gear plate 11 and the second gear plate 12 to rotate in the same direction, or in the opposite directions, e.g., the first motor 14A controls the first gear plate 11 to rotate in a clockwise direction, and the second motor 14B controls the second gear plate 12 to rotate in a counterclockwise direction. In addition, the first motor 14A and the second motor 14B can control the rotation of the first gear plate 11 and the second gear plate 12 at different speeds respectively. Therefore, the first gear plate 11 and the second gear plate 12 of the clamping device 1 in the present invention can rotate against each other in the opposite directions with equal speed, the opposite directions with unequal speed, the same direction with equal speed or the same direction with unequal speed.

It is worth noting that the first motor 14A and the second motor 14B of the clamping device 1 are fixed in the shell, and the first gear plate 11 and the second gear plate 12 are rotated respectively through the first driving plate 141 and the second driving plate 142. Therefore, when the first motor 14A drives the first gear plate 11 to rotate, the second motor 14B and the second gear plate 12 do not rotate with the rotation of the first gear plate 11.

In the present embodiment, the clamp assembly 15 comprises three clamp components 151, and each of the clamp components 151 is corresponding to a first rail slot 111, a second rail slot 121, and a guiding slot 131, i.e., each of the clamp components 151 is corresponding to a set of rails. Furthermore, the clamp component 151 has a connection portion 152 and a contact portion 153. The connection portion 152 of the clamp component 151 passes through and is disposed in the through hole formed at the intersection of the first rail slot 111, the second rail slot 121, and the guiding slot 131. The contact portion 153 of the clamp component 151 protrudes from the exterior of the shell 10 and is configured to contact the cover of the container. In the present embodiment, the clamp component 151 is a round bar, and the dimensions of the round bar can correspond to the dimensions of the first rail slot 111, the second rail slot 121, and the guiding slot 131.

Figure 4A:
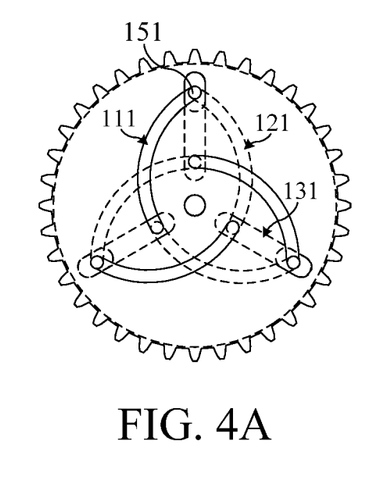
FIG. 4A to FIG. 4C are schematic diagrams illustrating a clamping device according to an embodiment of the present invention in different operation situations.
Figure 4B:
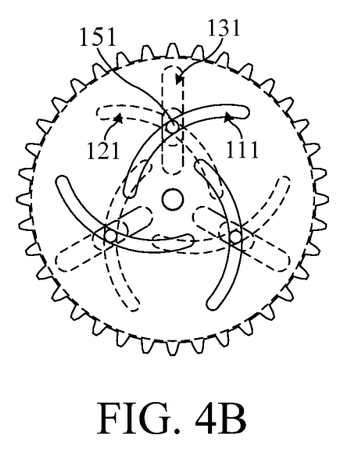
Figure 4C:
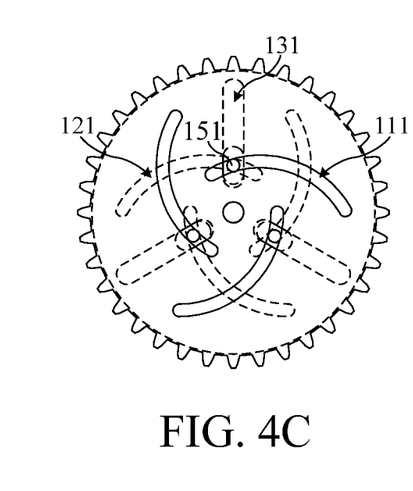

Please refer to FIG. 2, FIG. 3, and FIG. 4A to FIG. 4C. FIG. 4A to FIG. 4C are schematic diagrams illustrating a clamping device according to an embodiment of the present invention in different operation situations. FIG. 4A to FIG. 4C are top views of a combination of a first gear plate 11, a second gear plate 12, a guiding plate 13, and a clamp assembly 15. In practice, as shown in FIG. 4A, the first rail slot 111 of the first gear plate 11 and the second rail slot 121 of the second gear plate 12 are arranged symmetrically with each other. The guiding slot 131 of the guiding plate 13 is located in the middle position of the first rail slot 111 and the second rail slot 121. At this time, the clamp component 151 disposed at the through hole formed at the intersection of the first rail slot 111, the second rail slot 121 and the guiding slot 131 is located near the outer side of the first gear plate 11. As shown in FIG. 4B and FIG. 4C, when the first motor 14A drives the first gear plate 11 to rotate in a clockwise direction and the second motor 14B drives the second gear plate 12 to rotate in a counterclockwise direction (i.e., the first gear plate 11 and the second gear plate 12 rotate in the opposite direction), the first gear plate 11 pushes the clamp component 151 to move through the inner wall of the first rail slot 111, and simultaneously the second gear plate 12 also pushes the clamp component 151 to move through the inner wall of the second rail slot 121. Since the first rail slot 111 and the second rail slot 121 are arranged symmetrically to each other, the clamp component 151 will move in a straight line along the guiding slots 131 towards the first axis and move to a position close to the axis of the first gear plate 11. During the operation process from FIG. 4A to FIG. 4C, the positions of the three clamp components 151 of the clamp assembly 15 all move from the end of the guiding slots 131 near the outer edge to the end of the guiding slots 131 near the center of the axis, and at this time, the clamp assembly 15 is in a clamping state.

Notably, as shown in FIG. 4B and FIG. 4C, when the rotating shafts of the first motor 14A and the second motor 14B both rotate at the same speed, the first gear plate 11 and the second gear plate 12 are driven to rotate in opposite directions with the same speed, so the first rail slot 111 and the second rail slot 121 can move symmetrically and relatively to each other to drive the clamp component 151 to move toward the first axis. In practice, the first motor 14A and the second motor 14B can also drive the first gear plate 11 and the second gear plate 12 to rotate in opposite directions with unequal speeds. At this time, the first rail slot 111 and the second rail slot 121 are still moving relative to each other and can drive the clamp component 151 toward the first axis, so the clamp assembly 15 is in the clamping state. In addition, the first motor 14A and the second motor 14B can also drive the first gear plate 11 and the second gear plate 12 to rotate in the clockwise direction with the unequal speeds (in the same direction with the unequal speeds), and the rotation speed of the first gear plate 11 can be greater than the rotation speed of the second gear plate 12, but it is not limited to the aforementioned. Since the first gear plate 11 rotates faster, the clamp component 151 moves faster in the first rail slot 111, in other words, the inner wall of the first rail slot 111 will push the clamp component 151 to move toward the first axis, so the clamp assembly 15 can be in the clamping state.

When the first motor 14A and the second motor 14B respectively drive the first gear plate 11 in the counterclockwise direction and the second gear plate 12 to rotate in the clockwise direction with the equal speed or the unequal speeds (i.e., the operation process from FIG. 4C to FIG. 4A), or drive the first gear plate 11 in the counterclockwise direction and the second gear plate 12 to rotate in the counterclockwise direction with the unequal speeds (in the same direction with the unequal speeds), the positions of the three clamp components 151 of the clamp assembly 15 all move from the end of the guiding slots 131 near the center of the axis to the end of the guiding slots 131 near the outer edge, and at this time, the clamp assembly 15 is in an open state. In addition, when the first motor 14A and the second motor 14B drive the first gear plate 11 and the second gear plate 12 to rotate in the same direction with the same speed, the three clamp components 151 of the clamp assembly 15 can be maintained in a fixed position and the clamp assembly 15 will rotate around on the first axis.

Figure 5A:
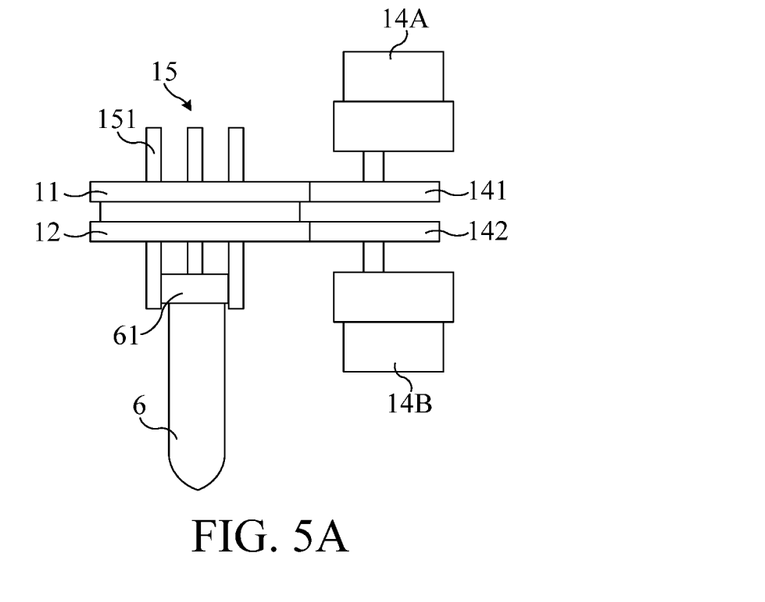
FIG. 5A is a schematic diagram illustrating a clamping device according to an embodiment of the present invention clamping a container.
Figure 5B:
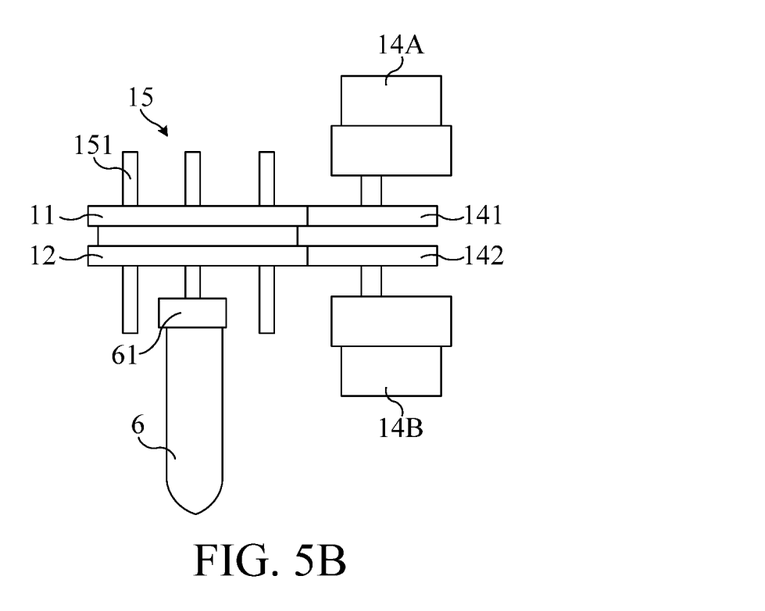
FIG. 5B is a schematic diagram illustrating a clamping device according to an embodiment of the present invention detaching a container.

Please refer to FIG. 1, FIG. 4A, FIG. 4B, FIG. 4C, FIG. 5A, and FIG. 5B. FIG. 5A is a schematic diagram illustrating a clamping device 1 according to an embodiment of the present invention clamping a container 6. FIG. 5B is a schematic diagram illustrating a clamping device 1 according to an embodiment of the present invention detaching a container 6. In practice, as shown in FIG. 4A and FIG. 5A, the initial state of the clamp assembly 15 of the clamping device 1 is the open state. When the container 6 is intended to be opened, the cover 61 of the container 6 is first moved to a middle position of the clamp assembly 15 protruding from the shell 10, and the position of the cover 61 is corresponding to the position of the contact portion 153 of the clamp component 151 of the clamp assembly 15. Then, as shown in FIG. 4C and FIG. 5B, the first motor 14A and the second motor 14B respectively drive the first gear plate 11 and the second gear plate 12 to rotate in opposite directions, so the three clamp components 151 contact and grip the cover 61 of the container 6. At this time, the cover 61 is fixed to the clamp assembly 15 and the clamp assembly 15 can drive the cover 61 to move. Furthermore, the first motor 14A and the second motor 14B respectively drive the first gear plate 11 and the second gear plate 12 to rotate in the same direction with the same speed (e.g., counterclockwise rotation), so the cover 61 rotates with the clamp assembly 15 to detach from the container 6.

When the container 6 is intended to be closed and the clamp assembly 15 has clamped the cover 61, the container 6 can be moved to the position corresponding to the cover 61, and then the first motor 14A and the second motor 14B respectively drive the first gear plate 11 and the second gear plate 12 to rotate in the same direction with the same speed (e.g., clockwise rotation), so the cover 61 rotates with the clamp assembly 15 to seal to the container 6. Finally, the first motor 14A and the second motor 14B respectively drive the first gear plate 11 and the second gear plate 12 to rotate in the opposite directions, so the three clamp components 151 are detached from the cover 61. Therefore, the two motors of the clamping device in the present invention can respectively drive the gear plate to rotate in the opposite directions or in the same direction, and the rail slots of the gear plates can control the opening and closing of the clamp assembly. According to the above-mentioned, the covers can be opened and closed automatically instead of screwing the covers manually, so as to enhance the efficiency and reduce the labor costs and the equipment costs.

In addition, due to the three clamp components 151 of the clamp assembly 15 are disposed in the three sets of rails, and the three clamp components 151 are not in direct contact with each other, so the degree of opening and closing of the three clamp components 151 will not be constrained by the structure of the clamp assembly 15 itself, and the three clamp components 151 can be greatly opened and clamped with the length of the guiding slot 131. Therefore, the clamp assembly 15 of the clamping device 1 in the present invention can clamp a variety of containers with different diameters of covers.

Please refer to FIG. 3 again. In the present embodiment, the clamping device 1 further comprises three slide blocks 16 respectively disposed in the guiding slots 131 of each of the three guiding plate 13, and the slide blocks 16 are configured to move in the guiding slots 131. The slide blocks 16 respectively comprise a mounting hole 161, and the connection portion 152 of the clamp component 151 is disposed in the mounting hole 161. In practice, the dimensions of the slide block 16 are corresponding to the dimensions of the guiding slot 131. When the clamp components 151 of the clamp assembly 15 are pushed by the inner wall of the first rail slot 111 and the inner wall of the second rail slot 121, the clamp components 151 can move smoothly and steadily in a straight line through the slide blocks 16, so as to improve the stability of the clamping.

In the present embodiment, the clamping device 1 comprises a controller (not shown) for respectively controlling the first motor 14A and the second motor 14B to output a first current value and a second current value to drive the first driving plate 141 and the second driving plate 142 to rotate. The first current value and the second current value can be the same or different to control the first driving plate 141 and the second driving plate 142 to rotate at equal or unequal speeds. Furthermore, the controller pre-stores a blocking current threshold, the blocking current threshold is three times than the first current value and the second current value, but it is not limited to the aforementioned, the blocking current threshold can also be determined according to the output current safety value of the motors. When the first current value or the second current value is greater than the blocking current threshold, the controller controls the first motor 14A and the second motor 14B to stop operation. In practice, when the clamp assembly 15 of the clamping device 1 grips the cover of the container, the clamp components 151 will all contact and press against the cover. At this time, the first motor 14A and the second motor 14B are unable to continue to drive the clamp components 151 to move toward the direction of the first axis, so the first current value and the second current value increase and a blocking current is formed. When the first current value or the second current value is greater than the blocking current threshold, it indicates that the clamp assembly 15 has clamped the cover of the container. At this time, the controller controls the first motor 14A and the second motor 14B to stop operation to avoid damage to the motors, the gear plates and the clamp components.

Similarly, when the clamping device 1 opens the clamp assembly 15, the clamp components 151 of the clamp assembly 15 all continue to move in a direction away from the first axis and against the end of the guiding slots 131. At this time, the first motor 14A and the second motor 14B are unable to continue to drive the clamp components 151 to move outwardly, so the first current value and the second current value increase and the blocking current is formed. When the first current value or the second current value is greater than the blocking current threshold, it indicates that the clamp assembly 15 has been opened to the maximum state. At this time, the controller controls the first motor 14A and the second motor 14B to stop operation. Furthermore, when the clamping device 1 clamps the cover and seals the container, the first motor 14A and the second motor 14B are unable to continue to drive the clamping device 1 to rotate, so the first current value and the second current value increase and a blocking current is formed. At this time, the controller can also control the first motor 14A and the second motor 14B to stop operation according to the first current value, the second current value and the blocking current threshold.

In addition, the controller can further pre-store a number of the cover opening rotations, and the number of the cover opening rotations can be determined according to the number of screw threads between the container and the cover. In practice, when the clamping device 1 clamps the cover and intends to detach the cover from the container, the controller can control the first motor 14A and the second motor 14B to drive the first gear plate 11 and the second gear plate 12 to rotate in the same direction at the same time through the number of the cover opening rotations, and open the cover of the container.

Figure 6:
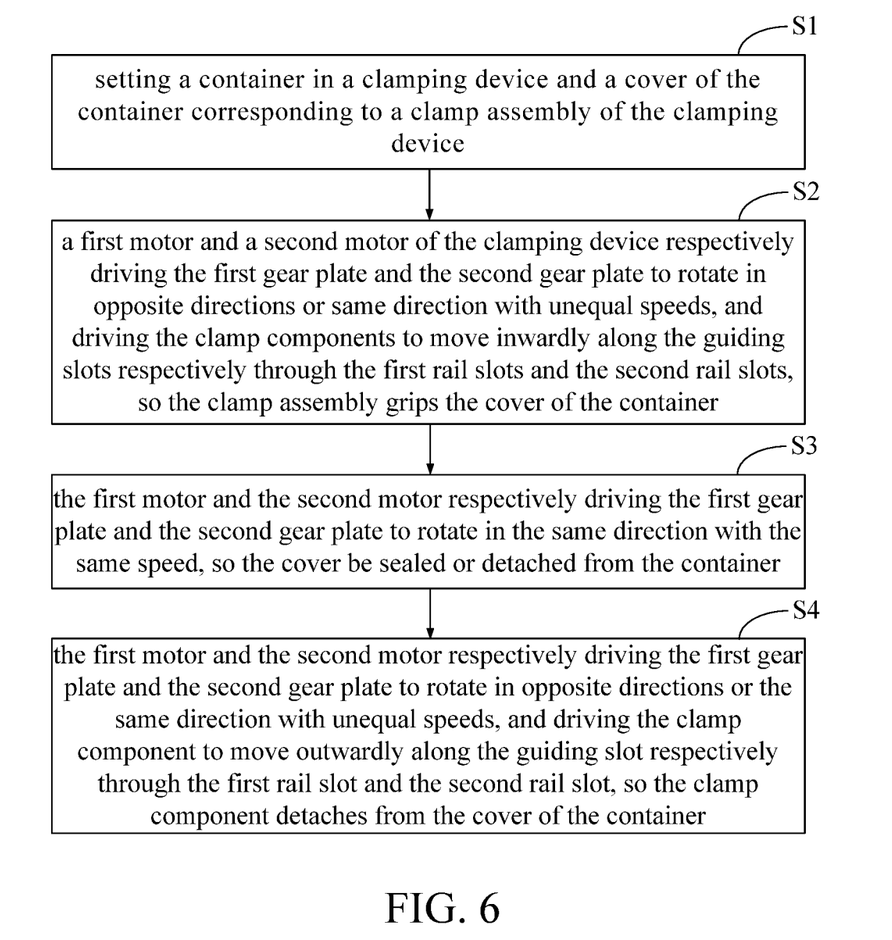
FIG. 6 is a flow chart illustrating steps of a clamping method according to an embodiment of the present invention.

Please refer to FIG. 6. FIG. 6 is a flow chart illustrating steps of a clamping method according to an embodiment of the present invention. The steps of the clamping method of FIG. 6 can be realized by the clamping device 1 of FIG. 1 to FIG. 5. As shown in FIG. 6, the clamping method of the present invention comprises the following steps of: step S1: setting a container 6 in a clamping device 1 and a cover 61 of the container 6 corresponding to a clamp assembly 15 of the clamping device 1. Wherein, the clamping device 1 comprises a first gear plate 11, a second gear plate 12, and a guiding plate 13. The clamp components 151 of the clamp assembly 15 are simultaneously and respectively disposed in first rail slots 111 of the first gear plate 11, and the second rail slots 121 of the second gear plate 12, and the guiding slots 131 of the guiding plate 13, and the first rail slots 111, the second rail slots 121, and the guiding slots 131 are interlaced with each other; step S2: a first motor 14A and a second motor 14B of the clamping device 1 drive respectively the first gear plate 11 and the second gear plate 12 to rotate in opposite directions, and the first gear plate 11 and the second gear plate 12 driving the clamp components 151 to move inwardly along the guiding slots 131 respectively through the first rail slots 111 and the second rail slots 121, so as to enable the clamp assembly 15 to grip the cover 61 of the container 6; and step S3: the first motor 14A and the second motor 14B respectively driving the first gear plate 11 and the second gear plate 12 to rotate in the same direction with the same speed, so as to enable the cover 61 to seal or detach from the container 6.

In addition, the clamping method of the present invention further comprises the following steps of: step S4: the first motor 14A and the second motor 14B respectively driving the first gear plate 11 and the second gear plate 12 to rotate in the opposite directions, and the first gear plate 11 and the second gear plate 12 driving the clamp component 151 to move outwardly along the guiding slot 131 respectively through the first rail slot 111 and the second rail slot 121, so as to enable the clamp component 151 to detach from the cover 61 of the container 6.

Figure 7:
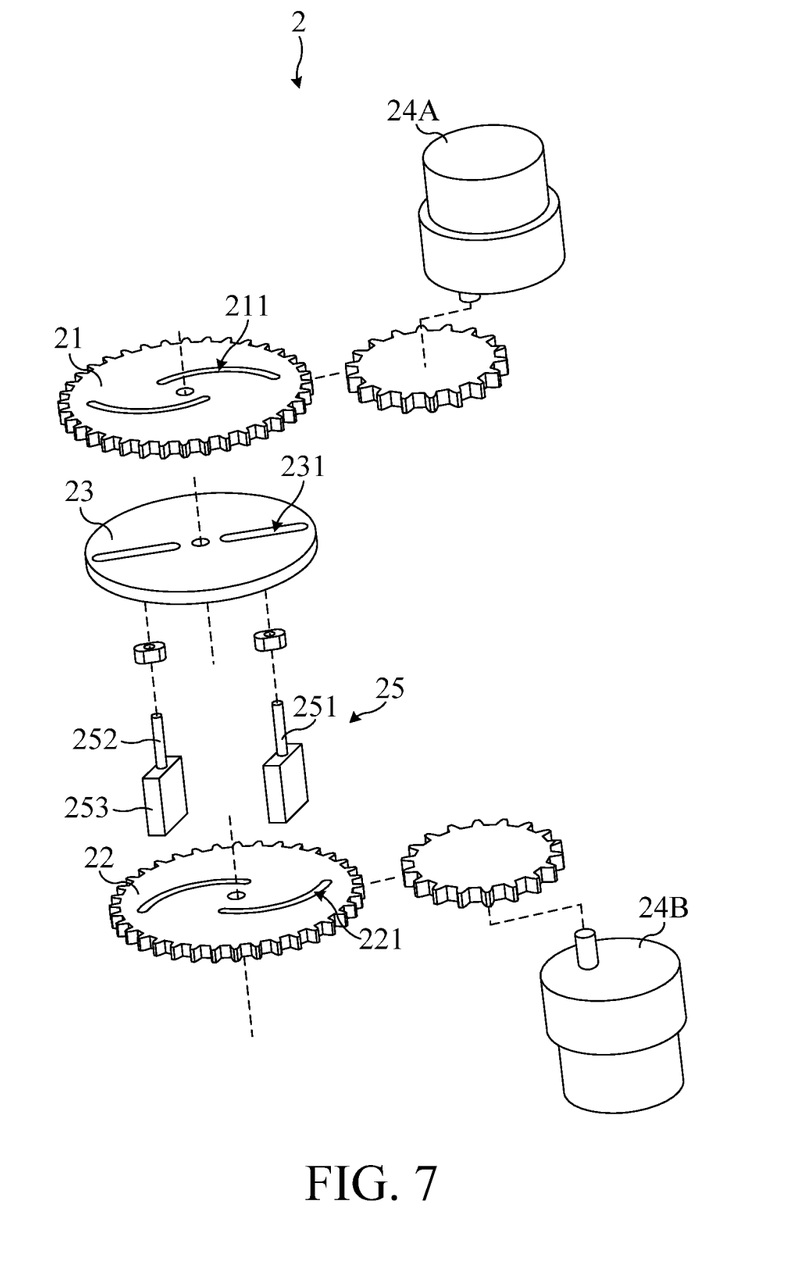
FIG. 7 is a structural schematic diagram illustrating a clamping device according to another embodiment of the present invention.

The clamping device of the present invention can be not only in the form of the aforementioned embodiments, but also in other forms. Please refer to FIG. 7. FIG. 7 is a structural schematic diagram illustrating a clamping device 2 according to another embodiment of the present invention As shown in FIG. 7, the present embodiment differs from the aforementioned embodiments in that the first gear plate 21 of the clamping device 2 in the present embodiment has two first rail slots 211, the second gear plate 22 has two second rail slots 221, the guiding plate 23 has two guiding slots 231, and the clamp assembly 25 contains two clamp components 251. Furthermore, the connection portion 252 of the clamp component 251 is a round bar and the shape of the contact portion 253 is corresponding to the shape of the cover of the container. In practice, the first rail slots 211, the second rail slots 221, the two guiding slots 231, and the clamp components 251 can be disposed symmetrically and relatively to each other. When the first motor 24A and the second motor 24B respectively drive the first gear plate 21 and the second gear plate 22 to rotate in opposite directions, the clamp components 251 of the clamp assembly 25 can move close to each other to grip the cover of the container. In addition, the contact portion 253 of the clamp component 251 can have a ratchet structure on the surface facing the cover. When the clamp assembly 25 grips the cover of the container, the clamp component 251 can increase the friction between the contact portion 253 and the cover through the ratchet structure, so as to enhance the clamping effect and prevent the cover from slipping off from the clamp component 251. In an embodiment, the contact portion of the clamp component is a removable component installed on the connection portion, and the contact portion can be an elastic component made of high friction material. When the clamp assembly grips the cover of the container, the contact portion of the clamp component is temporarily molded to correspond to the shape of the cover due to the clamping force, so as to enhance the clamping effect.

In summary, the two motors of the clamping device in the present invention can respectively drive the gear plate to rotate in the opposite directions or in the same direction, and the rail slots of the gear plates can control the opening and closing of the clamp assembly. According to the above-mentioned, the covers can be opened and closed automatically instead of screwing the covers manually, so as to enhance the efficiency and reduce the labor costs and the equipment costs. In addition, the clamp components of the clamping device in the present invention can move smoothly and steadily in a straight line through the slide blocks, so as to improve the stability of the clamping.

With the examples and explanations mentioned above, the features and spirits of the invention are hopefully well described. More importantly, the present invention is not limited to the embodiment described herein. Those skilled in the art will readily observe that numerous modifications and alterations of the device can be made while retaining the teachings of the invention. Accordingly, the above disclosure should be construed as limited only by the metes and bounds of the appended claims.

What is claimed is:

1. A clamping device for a cover of a container, the clamping device being configured to seal the cover to the container or detach the cover from the container, the clamping device comprising:
- a first gear plate, having a first axis and at least two first rail slots, the first rail slots being arc-shaped and located on one side of the first axis;
- a second gear plate, having a second axis and at least two second rail slots, the second axis being collinear with the first axis, the second rail slots being arc-shaped and located on one side of the second axis, and the second rail slots being interlaced with the first rail slots, respectively;
- a guiding plate, disposed between the first gear plate and the second gear plate and having a third axis and at least two guiding slots, the third axis being collinear with the first axis, the guiding slots being straight and radially disposed around the third axis, and the guiding slots being interlaced with the first rail slots and the second rail slots, respectively;
- a first motor, coupled to the first gear plate to drive the first gear plate to rotate about the first axis;
- a second motor, coupled to the second gear plate to drive the second gear plate to rotate about the second axis; and
- a clamp assembly, comprising at least two clamp components, each of the clamp components having a connection portion and a contact portion, the connection portion of each of the clamp components being disposed in a respective one of the first rail slots, a respective one of the second rail slots, and a respective one of the guiding slots, and the contact portion of each of the clamp components being configured to contact the cover of the container;
- wherein, when the first motor and the second motor respectively drive the first gear plate and the second gear plate to rotate in one of opposite directions or the same direction with unequal speeds, the first gear plate and the second gear plate drive the clamp components to move along the guiding slots toward the first axis respectively through the first rail slots and the second rail slots, so as to enable the clamp assembly to grip the cover of the container.

2. The clamping device of claim 1, wherein when the clamp assembly grips the cover of the container and the first motor and the second motor respectively drive the first gear plate and the second gear plate to rotate in the same direction at the same speed, the first gear plate and the second gear plate drive the clamp components to rotate about the first axis for sealing the cover to the container or detaching the cover from the container.

3. The clamping device of claim 1, wherein each clamp component is a round bar.

4. The clamping device of claim 1, wherein the connection portion of each clamp component is a round bar and a shape of the contact portion of each clamp component corresponds to a shape of the cover of the container.

5. The clamping device of claim 1, further comprising at least two slide blocks respectively disposed in the guiding slots to move in the guiding slots, each slide block respectively comprising a mounting hole, the connection portion of each clamp component being disposed in a respective one of the first rail slots, a respective one of the second rail slots, and a respective one of the mounting holes at the same time.

6. The clamping device of claim 1, wherein when the first motor and the second motor respectively drive the first gear plate and the second gear plate to rotate in one of the opposite directions or the same direction with unequal speeds, the clamp components simultaneously move toward the first axis to grip the cover of the container.

7. A clamping method for sealing a cover to a container or detaching the cover from the container, the clamping method comprising the steps of:
- setting a container and a cover of the container in a clamping device, wherein the clamping device comprises a first gear plate, a second gear plate, a guiding plate, and a clamp assembly, wherein at least two clamp components of the clamp assembly are simultaneously and respectively disposed in at least two first rail slots of the first gear plate, at least two second rail slots of the second gear plate, and at least two guiding slots of the guiding plate, and wherein the first rail slots, the second rail slots, and the guiding slots are interlaced with one another;
- using a first motor and a second motor of the clamping device, respectively driving the first gear plate and the second gear plate to rotate in one of opposite directions or the same direction with unequal speeds, the first gear plate and the second gear plate driving the clamp components to move inwardly along the guiding slots respectively through the first rail slots and the second rail slots, so as to enable the clamp assembly to grip the cover of the container; and
- using the first motor and the second motor, respectively driving the first gear plate and the second gear plate to rotate in the same direction with the same speed, so as to seal the cover to the container or detach the cover from the container.

8. The clamping method of claim 7, further comprising the step of:
- using the first gear plate and the second gear plate, driving the clamp components to move outwardly along the guiding slots through the first rail slots and the second rail slots, respectively, so as to cause the clamp components to detach from the cover of the container.

9. The clamping method of claim 7, wherein each clamp component is a round bar.

10. The clamping method of claim 7, wherein each clamp component comprises a connection portion and a contact portion, the connection portion is a round bar disposed in a respective one of the first rail slots, a respective one of the second rail slots, and a respective one of the guiding slots at the same time, and a shape of the contact portion corresponds to a shape of the cover of the container.

* * * * *